US006812599B2

(12) United States Patent
Matsushita et al.

(10) Patent No.: US 6,812,599 B2
(45) Date of Patent: Nov. 2, 2004

(54) LOW-PROFILE STEPPING MOTOR WITH TWO COILS ARRANGED FLUSH WITH EACH OTHER HORIZONTALLY

(75) Inventors: Kunitake Matsushita, Shizuoka-ken (JP); Hiroshi Sano, Shizuoka-ken (JP); Toshihiko Nagata, Shizuoka-ken (JP)

(73) Assignee: Minebea Co., Ltd., Nagano-Ken (JP)

( * ) Notice: Subject to any disclaimer, the term of this patent is extended or adjusted under 35 U.S.C. 154(b) by 0 days.

(21) Appl. No.: 10/672,263

(22) Filed: Sep. 26, 2003

(65) Prior Publication Data

US 2004/0100161 A1 May 27, 2004

(30) Foreign Application Priority Data

Oct. 24, 2002 (JP) ........................................ 2002-309914

(51) Int. Cl.[7] .............................................. H02K 37/14
(52) U.S. Cl. .......................... 310/49 R; 310/43; 310/91
(58) Field of Search ................................ 310/49 R, 43, 310/254, 257, 216, 218

(56) References Cited

U.S. PATENT DOCUMENTS

| 5,703,419 | A | * | 12/1997 | Mizutani ................. 310/49 R |
| 5,829,119 | A | | 11/1998 | Matsushita et al. |
| 6,703,728 | B1 | * | 3/2004 | Goubely et al. .......... 310/49 R |

FOREIGN PATENT DOCUMENTS

| FR | 2 793 966 | | 11/2000 | ............... 310/49 R |
| JP | 2-311159 | * | 12/1990 | ............... 310/49 R |
| JP | 4-133654 | * | 5/1992 | ............... 310/49 R |
| JP | 10-94237 | | 4/1998 | ............... 310/49 R |

OTHER PUBLICATIONS

2002/0036433 A1; Published Mar. 28, 2002; Eiji Mayumi, et al.

* cited by examiner

Primary Examiner—Tran Nguyen
(74) Attorney, Agent, or Firm—Choate, Hall & Stewart

(57) ABSTRACT

A low-profile stepping motor comprises: a first stator unit including first upper and lower stator yokes each having a plurality of pole teeth which are formed along its semicircular inner circumference, and a first coil unit fixedly sandwiched between the first upper and lower stator yokes; a second stator unit including second upper and lower stator yokes formed as one piece integrally with the first upper and lower stator yokes, respectively, and each having a plurality of pole teeth which are formed along its semicircular inner circumference, and a second coil unit fixedly sandwiched between the second upper and lower stator yokes; a rotor assembly rotatably disposed in a circular open space defined by the pole teeth of the first and second stator units; and a spacer block disposed between the upper and lower stator yokes and adapted to surround the first and second coil units and the pole teeth.

5 Claims, 4 Drawing Sheets

LOW-PROFILE STEPPING MOTOR WITH TWO COILS ARRANGED FLUSH WITH EACH OTHER HORIZONTALLY

BACKGROUND OF THE INVENTION

1. Field of the Invention

The present invention relates to a stepping motor, and specifically to a low-profile stepping motor having its dimension reduced in an axial direction.

2. Description of the Related Art

Recently, in accordance with enhanced performance of various devices such as printers, facsimiles and floppy (Registered Trademark) disk drives, a stepping motor is required to be higher in torque, and lower in cogging torque and vibration. Under the circumstance, a PM (permanent magnet) stepping motor such as is disclosed in Japanese Patent Publication No. Hei 10-127024 has been extensively used to meet the requirements.

FIG. 1 is a partly cutaway perspective view of a conventional PM stepping motor. As shown in FIG. 1, the PM stepping motor generally comprises: a stator assembly 6 composed of two stator units 6A and 6B; a rotor assembly 13; a face plate 1 punched out of a stainless steel plate; and a front bearing 2 made of oil impregnated alloy. The stator units 6A and 6B each comprise: stator yokes 3a and 3b each punched out of a soft magnetic steel plate and each having a plurality of pole teeth 10 bent up along its inner circumference; and a coil 4 formed such that a copper wire with polyurethane insulation is wound on a bobbin 5 housed in the stator yokes 3a and 3b, and are attached back-to-back to each other. The rotor assembly 13 comprises: a rotary shaft 8; a cylindrical magnet 9 for magnetic field, having a plurality of magnetic poles at its circumferential surface, and having the circumferential surface opposing the pole teeth 10 of the stator yokes 3a, 3b; and a sleeve 12 to fasten the cylindrical magnet 9 and the rotary shaft 8 together such that the rotary shaft 8 is press-fitted into the sleeve 12, and the sleeve 12 with adhesive applied thereon is inserted into the cylindrical magnet 9. The rotor assembly 13 thus structured has its outer circumference (of the magnet 9) magnetized for a predetermined number of magnetic poles, and is rotatably disposed inside the stator assembly 6 such that the rotary shaft 8 is supported by the front bearing 2 and a rear bearing (not shown in FIG. 1), and that the magnetic poles oppose the pole teeth 10 with a slight gap therebetween.

The stator unit 6A is structured such that the pole teeth 10 of the stator yoke 3a mesh with the pole teeth 10 of the stator yoke 3b equidistantly from each other with a shift by an electrical angle of 180 degrees (half pitch). The stator unit 6B is of the same structure as the stator unit 6A. The stator units 6A and 6B thus structured are joined back-to-back to each other by molding with polymeric material or by plasma welding such that their respective pole teeth 10 and 10 are shifted from each other by an electrical angle of 90 degrees, whereby the rotor assembly 13 always starts its rotation in the same direction.

Recently, since the devices incorporating PM stepping motors are required to be downsized and lower profiled, the PM stepping motors are also required to be further lower profiled. The conventional PM stepping motor, however, is composed of two stator units joined to each other back-to-back thus making it extremely difficult or almost impossible to further reduce its profile dimension. And the conventional PM stepping motor uses four discrete stator yokes, which inevitably increases the number of the components and makes alignment troublesome.

SUMMARY OF THE INVENTION

The present invention has been made in view of the above circumstance, and it is an object of the present invention to provide a low-profile stepping motor which is of a simple structure and which has its dimension drastically reduced in the axial direction.

In order to achieve the object, according to a first aspect of the present invention, a low-profile stepping motor comprises: a stator assembly composed of first and second stator units; a rotor assembly; and a spacer block. The first stator unit includes: a first upper stator yoke having a plurality of pole teeth which are formed along its semicircular inner circumference; a first lower stator yoke having a plurality of pole teeth which are formed along its semicircular inner circumference and which mesh with the pole teeth of the first upper stator yoke; and a first coil unit fixedly sandwiched between the first upper and lower stator yokes. The second stator unit includes: a second upper stator yoke formed as one piece integrally with the first upper stator yoke, and having a plurality of pole teeth which are formed along its semicircular inner circumference; a second lower stator yoke formed as one piece integrally with the first lower stator yoke, and having a plurality of pole teeth which are formed along its semicircular inner circumference and which mesh with the pole teeth of the second upper stator yoke; and a second coil unit fixedly sandwiched between the second upper and lower stator yokes and arranged horizontally flush with the first coil unit. The rotor assembly is rotatably disposed in a circular open space defined by the pole teeth of the first and second stator units. And the spacer block is disposed in the stator assembly and has openings shaped to surround the first and second coil units, and the pole teeth. With the structure described above, while the stepping motor can be significantly reduced in thickness, the entire assembly can be made rigid even if the stator yokes are made of a thin steel plate for downsizing, resin molding for a gap space between the intermeshing pole teeth can be performed using only a molding die set inside the pole teeth, and magnet wires of the coil units are prevented from breaking.

According to a second aspect of the present invention, in the low-profile stepping motor of the first aspect, the spacer block is of a single piece structure. Consequently, the spacer block keeps readily and surely the upper and lower stator yokes equidistant from and in parallel to each other.

According to a third aspect of the present invention, in the low-profile stepping motor of the first or second aspect, the spacer block is formed of resin. Consequently, an insulating spacer block can be produced easily.

According to a fourth aspect of the present invention, in the low-profile stepping motor of any one of the first to third aspects, the spacer block has, on its side, a plurality of hooks for securely retaining lead wires leading out from the first and second coil units. Consequently, the lead wires are prevented from accidentally getting unhooked, thereby providing high reliability.

According to a fifth aspect of the present invention, in the low-profile stepping motor of the fourth aspect, the hooks are shaped like an L-letter in cross-section with their shorter bar sections joined to the side of the spacer block and are disposed in a line such that the shorter bar sections are positioned alternately at the opposite ends to one another. Consequently, the lead wires are surely prevented from getting unhooked, thereby ensuring high reliability.

DETAILED DESCRIPTION OF THE PREFERRED EMBODIMENTS

Preferred embodiments of the present invention will hereinafter be described with reference to the accompanying drawings.

Figure 1:
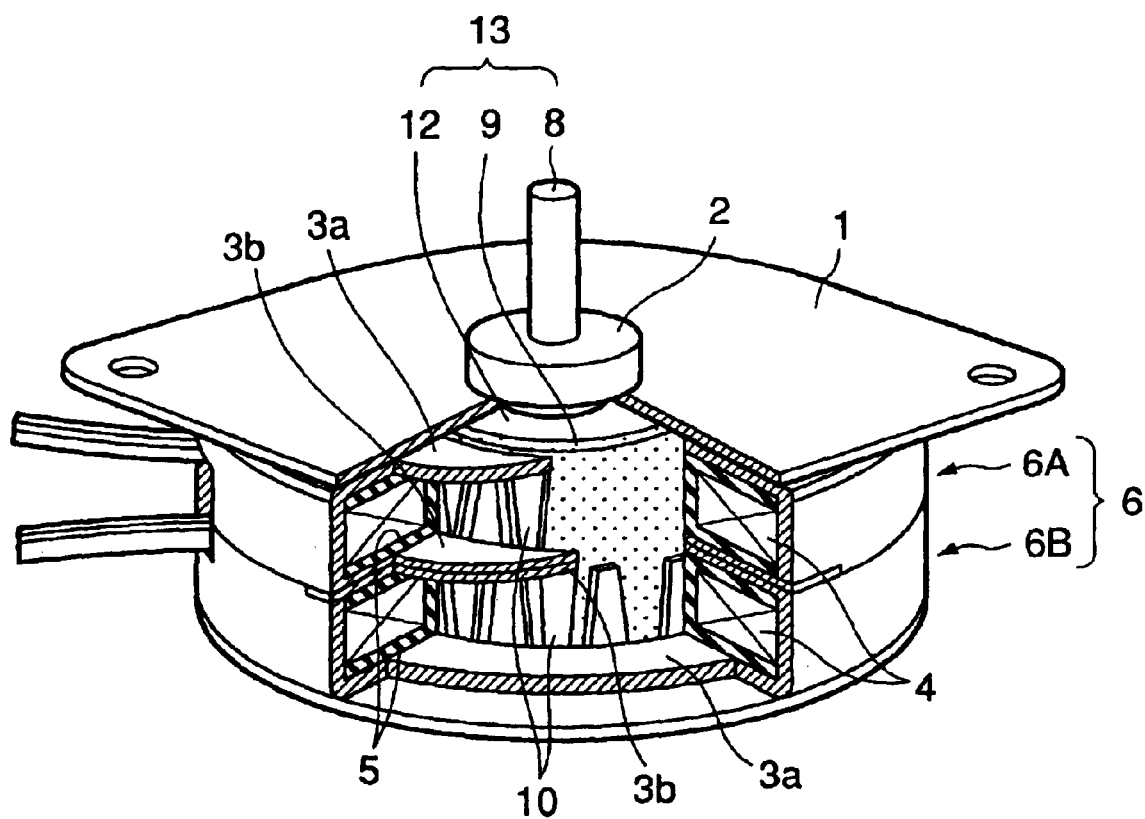
FIG. 1 is a partly cutaway view of a conventional PM stepping motor.
Figure 2:
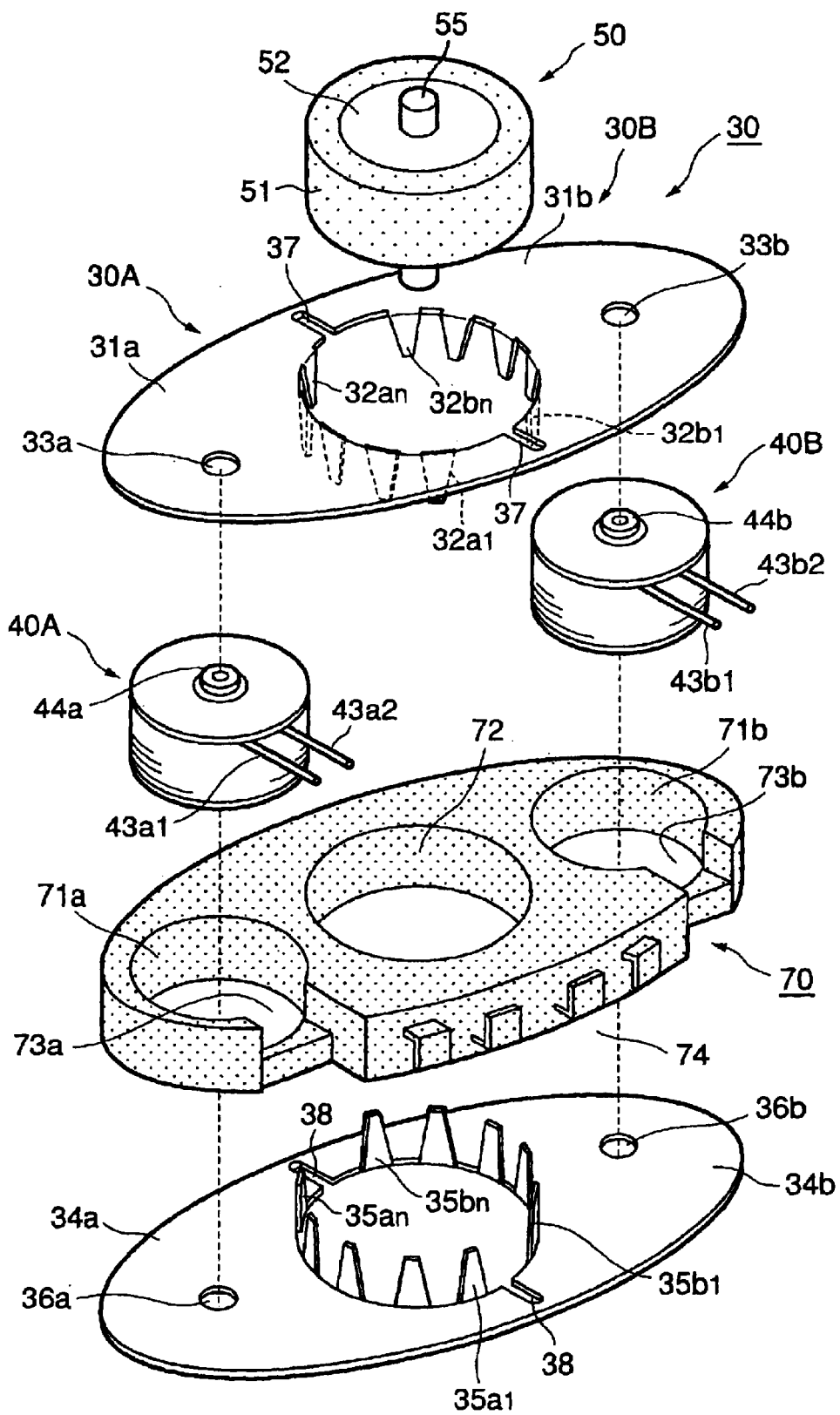
FIG. 2 is an exploded perspective view of a low-profile stepping motor according to an embodiment of the present invention.

Referring to FIG. 2, a low-profile stepping motor of the present invention generally comprises: a stator assembly 30 including first and second stator units 30A and 30B assembled to be horizontally flush with each other; a rotor assembly 50 rotatably disposed inside the stator assembly 30; and a spacer block 70 set in the stator assembly 30.

The first stator unit 30A comprises: first upper and lower stator yokes 31a and 34a; and a first coil unit 40A which is composed of a bobbin 41a and a winding 42a provided around the bobbin 41a, is sandwiched between the first upper and lower stator yokes 31a and 34a, and which is provided with terminal pins 43a1 and 43a2. The first upper stator yoke 31a is punched out of a soft magnetic steel plate, includes a plurality of pole teeth 32a1 to 32an punched out of the soft magnetic steel plate and bent up inward (downward in FIG. 2) at its semicircular inner circumference, and has a hole 33a for engaging with a top protrusion 44a of the first coil unit 40A. The first lower stator yoke 34a is punched out of a soft magnetic steel plate, includes a plurality of pole teeth 35a1 to 35an punched out of the soft magnetic steel plate and bent up inward (upward in FIG. 2) at its semicircular inner circumference, and has a hole 36a for engaging with a bottom protrusion 44a (see FIG. 3) of the first coil unit 40A.

The second stator unit 30B comprises: second upper and lower stator yokes 31b and 34b which are punched out as one piece integrally with the first upper and lower stator yokes 31a and 34a, respectively; and a second coil unit 40B which is composed of a bobbin 41b and a winding 42b provided around the bobbin 41b, is sandwiched between the second upper and lower stator yokes 31b and 34b, and which is provided with terminal pins 43b1 and 43b2. The second upper stator yoke 31b is punched out of a soft magnetic steel plate, includes a plurality of pole teeth 32b1 to 32bn punched out of the soft magnetic steel plate and bent up inward (downward in FIG. 2) at its semicircular inner circumference, and has a hole 33b for engaging with a top protrusion 44b of the second coil unit 40B. The second lower stator yoke 34b is punched out of a soft magnetic steel plate, includes a plurality of pole teeth 35b1 to 35bn punched out of the soft magnetic steel plate and bent up inward (upward in FIG. 2) at its semicircular inner circumference, and has a hole 36b for engaging with a bottom protrusion 44b (see FIG. 3) of the second coil unit 40B.

The plurality of pole teeth 32a1 to 32an of the first upper stator yoke 31a and the plurality of pole teeth 32b1 to 32bn of the second upper stator yoke 31b are punched out simultaneously, and the plurality of pole teeth 35a1 to 35an of the first lower stator yoke 34a and the plurality of pole teeth 35b1 to 35bn of the second lower stator yoke 34b are punched out simultaneously.

Each stator yoke has pole teeth provided in number corresponding to the required number of steps per rotation of a stepping motor and arranged equidistant from one another. The pole teeth 32a1 to 32an of the first upper stator yoke 31a and the pole teeth 35a1 to 35an of the first lower stator yoke 34a mesh with each other with a shift by an electrical angle of 180 degrees, and the pole teeth 32b1 to 32bn of the second upper stator yoke 31b and the pole teeth 35b1 to 35bn of the second lower stator yoke 34b mesh with each other with a shift by an electrical angle of 180 degrees.

In each of the upper and lower stator yokes of the first and second stator units 30A and 30B thus structured, two pole teeth located adjacent to each other sandwiching one of a pair of slot cuts 37 or 38 (detailed hereinafter) are shifted from each other by an electrical angle of 90 degrees or 270 degrees. Specifically, in the first and second upper stator yokes 31a and 31b, the pole tooth 32a1 is shifted by an electrical angle of 90 degrees or 270 degrees from the pole tooth 32b1 located adjacent to the pole tooth 32a1 sandwiching one slot cut 37, and the pole tooth 32an is shifted by an electrical angle of 90 degrees or 270 degrees from the pole tooth 32bn located adjacent to the pole tooth 32an sandwiching the other slot cut 37, and in the first and second lower stator yokes 34a and 34b, the pole tooth 35a1 is shifted by an electrical angle of 90 degrees or 270 degrees from the pole tooth 35b1 located adjacent to the 35a1 sandwiching one slot cut 38, and the pole tooth 35an is shifted by an electrical angle of 90 degrees or 270 degrees from the pole tooth 35bn located adjacent to the pole tooth 35an sandwiching the other slot cut 38.

The first and second upper stator yokes 31a and 31b are punched out as one piece with the pair of slot cuts 37 above mentioned being formed right midway between the first and second upper stator yokes 31a and 31b thereby minimizing magnetic interflow therebetween so as not to have magnetic influence on each other, and the first and second lower stator yokes 34a and 34b are punched out as one piece with the pair of slot cuts 38 above mentioned being formed right midway between the first and second lower stator yokes 34a and 34b thereby minimizing magnetic interflow therebetween so as not to have magnetic influence on each other. The first and second upper stator yokes 31a and 31b, and the first and second lower stator yokes 34a and 34b are formed of a soft magnetic steel plate, such as silicon steel plate, SECC (galvanized steel plate) and SUY (electromagnetic soft iron).

The rotor assembly 50 comprises: a cylindrical magnet 51 formed of ferrite magnet, rare-earth magnet and so forth, and magnetized at regular intervals; a rotary shaft 55 made of non-magnetic stainless steel; and a sleeve 52 made of aluminum, and is structured such that the cylindrical magnet 51 is adhesively fixed to the sleeve 52 which has the rotary shaft 55 press-fitted thereinto. The rotor assembly 50 is rotatably disposed inside the stator assembly 30 with a slight gap between the cylindrical magnet 51 and the pole teeth of the stator assembly 30, and always starts rotating in the same direction by means of the first and second stator units 30A and 30B.

The spacer block 70 has openings 71a, 71b and 72 shaped to surround and lodge respectively the first coil unit 40A, the second coil unit 40B, and the pole teeth 32a1 to 32an, 32b1 to 32bn, 35a1 to 35an, and 35b1 to 35bn. The opening 71a is continuous with a cut 73a for letting out the terminal pins 43a1 and 43a2 therethrough, and the opening 71b is continuous with a cut 73b for letting out the terminal pins 43b1 and 43b2 therethrough. The spacer block 70 has hooks 74, which retain securely lead wires leading out from the terminal pins 43a1, 43a2, 43b1 and 43b2, provided at a side having the cuts 73 and 74b. The spacer block 70 is formed of resin such as PBT (polybutylene terephthalate), which is highly insulative and excellent in heat resistance.

Figure 3:
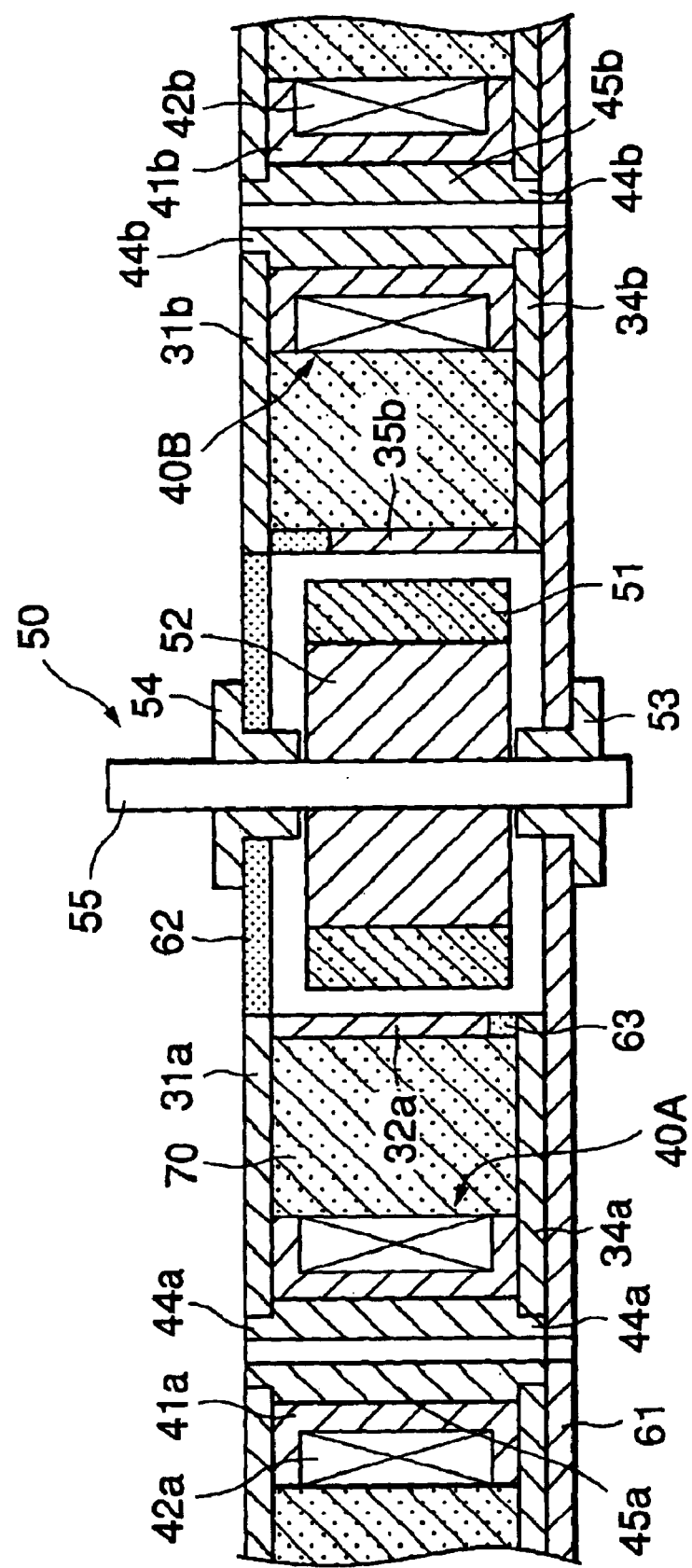
FIG. 3 is a cross sectional view of the low-profile stepping motor of FIG. 1.

Referring now to FIG. 3, the first coil unit 40A includes a cylindrical stud 45a which is formed of metal, has the aforementioned top and bottom protrusions 44a, 44a, and which has the aforementioned winding 42a therearound, and the second coil unit 40B includes a cylindrical stud 45b which is formed of metal, has the aforementioned top and bottom protrusions 44b, 44b, and which has the aforementioned winding 42b therearound.

The first and second coil units 40A and 40B are lodged respectively in the openings 71a and 71b (see FIG. 2) of the spacer block 70, and the pole teeth 32a1 to 32an, 32b1 to 32bn, 35a1 to 35an, and 35b1 to 35bn, which are represented by 32a, 32b (not shown), 35a (not shown), and 35b, respectively, are lodged in the opening 72 (see FIG. 2) of the spacer block 70. The first and second upper stator yokes 31a and 31b and the first and second lower stator yokes 34a and 34b are duly positioned and fixedly put together such that the holes 33a and 33b of the first and second upper stator yokes 31a and 31b engage with the top protrusions 44a and 44b of the cylindrical studs 45a and 45b, and the holes 36a and 36b of the first and second lower stator yokes 34a and 34b engage with the bottom protrusions 44a and 44b of the cylindrical studs 45a and 45b. The engagement may be reinforced by bonding or welding as required.

The spacer block 70 lodges the first and second coil units 40A and 40B and the pole teeth 32a, 32b, 35a and 35b, and are sandwiched firmly between the first and second upper stator yokes 31a and 31b and the first and second lower stator yokes 34a and 34b, whereby the entire assembly can be kept rigid and the upper and lower stator yokes can be kept equidistant from each other in parallel. Also, the problem that the wires of the coil units 40A and 40B, when having a small diameter, can be broken from damages incurred during and after assembly can be prevented by the spacer block 70 lodging the coil units 40a and 40B.

The cylindrical studs 45a, together with the first upper and lower stator yokes 31a and 34a, forms a part of a closed magnetic path, and the cylindrical studs 45b, together with the second upper and lower stator yokes 31b and 34b, forms a part of a closed magnetic path. Thanks to the cylindrical studs 45a and 45b, the first and second coil units 40A and 40B can be attached easily, and the first and second upper stator yokes 31a and 31b and the first and second lower stator yokes 34a and 34b can be set in position easily and surely.

Resin is filled in the gap space between the intermeshing pole teeth thereby forming a resin portion 63 for reinforcement. For the process of filling resin in the gap space, molding dies are required previously both outside and inside the pole teeth 32a, 32b, 35a and 35b, but now with the spacer block 70 covering the outside of the pole teeth 32a, 32b, 35a and 35b the outside die is not required. In this process, a resin plate 62 is formed simultaneously. A bearing 54 is attached to the resin plate 62, and the rotary shaft 55 of the rotor assembly is let through the bearing 54.

And, a plate 61 punched out of a non-magnetic steel plate and having a bearing 53 attached thereto is fixed to the first and second lower stator yokes 34a and 34b by welding, bonding, crimping and the like. The rotor assembly is rotatably supported by the bearings 53 and 54.

Figure 4:
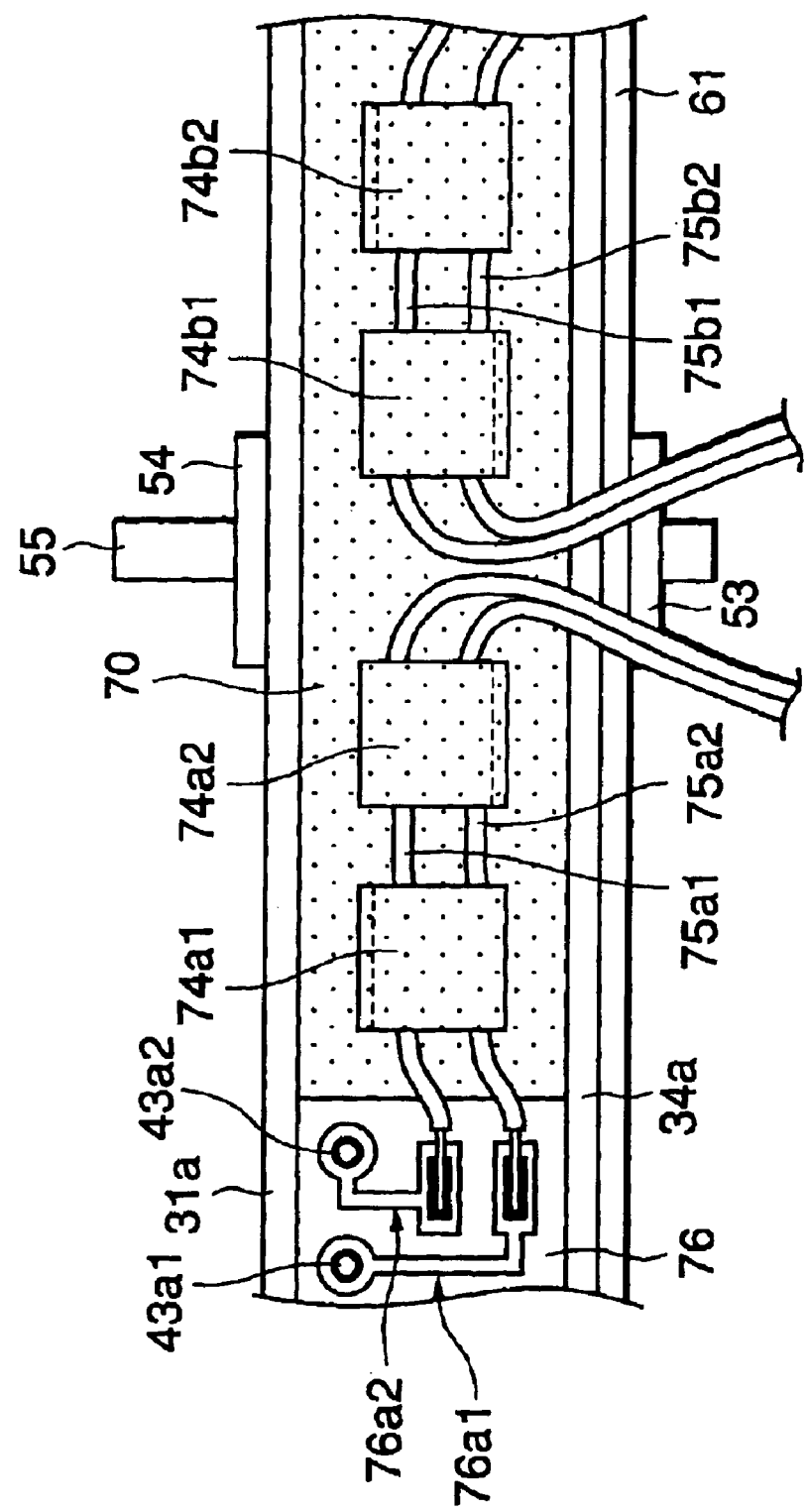
FIG. 4 is a side view of the low-profile stepping motor of FIG. 2.

Referring to FIG. 4, hooks 74a1, 74a2, 74b1 and 74b2 for securing the lead wires leading out from the coil units 40A and 40B are formed in a line at one side of the spacer block 70. A connection circuit board 76 is disposed at the cut 73a shown in FIG. 2. The terminal pins 43a1 and 43a2 are soldered to patterns 76a1 and 76a2, respectively, formed on the connection circuit board 76, and the lead wires 75a1 and 75a2 are also soldered to the patterns 761 and 76a2, respectively, whereby the terminal pins 43a1 and 43a2 are electrically connected to the lead wires 75a1 and 75a2, respectively. In the same way, the terminal pins 43b1 and 43b2 shown in FIG. 2 are electrically connected to the lead wires 75b1 and 75b2, respectively.

The hooks 74a1, 74a2, 74b1 and 74b2 are square in plan view, shaped like an L-letter in cross section, and each provided at the side of the spacer block 70 such that its shorter bar section is joined to the side and that its longer bar section is oriented substantially parallel to the side, and the lead wires are secured between the side of the spacer block 70 and respective longer bar sections of the hooks 74. The hooks 74a1 and 74a2 are formed in a line such that their respective shorter bar sections which are joined to the side of the spacer block 70 are positioned on the opposite ends to each other. The hooks 74b1 and 74b2 are provided in the same way as the hooks 74a1 and 74a2.

The lead wires 75a1 and 75a2 are securely retained by the hooks 74a1 and 74ab, and the lead wires 75b1 and 75b2 are securely retained by the hooks 74b1 and 74b2. Since the hooks 74a1 and 74a2 are formed such that their shorter bar sections joined to the side of the spacer block 70 are positioned at the opposite ends to each other, the lead wires 75a1 and 75a2 are prevented from accidentally getting unhooked. The hooks 75b1 and 74b2 are formed in the same way thus preventing the lead wires 75b1 and 75b2 from accidentally getting unhooked.

The plate 61 is attached to the lower side of the low-profile stepping motor in the embodiment discussed above, but may alternatively be attached to the upper side thereof.

While the present invention has been illustrated and explained with respect to specific embodiment thereof, it is to be understood that the present invention is by no means limited thereto but encompasses all changes and modifications which will become possible within the scope of the appended claims.

What is claimed is:

1. A low-profile stepping motor comprising a first unit including: a first upper stator yoke having a plurality of pole teeth formed along a semicircular inner circumference thereof; a first lower stator yoke having a plurality of pole teeth formed along a semicircular inner circumference thereof, the pole teeth of the first lower stator yoke meshing with the pole teeth of the first upper stator yoke; and a first coil unit fixedly sandwiched between the first upper and lower stator yokes, a second stator unit including: a second upper stator yoke formed as one piece integrally with the first upper stator yoke, and having a plurality of pole teeth formed along a semicircular inner circumference thereof; a second lower stator yoke formed as one piece integrally with the first lower stator yoke, and having a plurality of pole teeth formed along a semicircular inner circumference thereof, the pole teeth of the second lower stator yoke meshing with the pole teeth of the second upper stator yoke; and a second coil unit fixedly sandwiched between the second upper and lower stator yokes and arranged horizontally flush with the first coil unit, a rotor assembly rotatably disposed in a circular open space defined by the pole teeth of the first and second stator units; and a spacer block disposed between the first and second upper stator yokes and the first and second lower stator yokes, and adapted to surround the first coil unit, the second coil unit, and the pole teeth.

2. A low-profile stepping motor according to claim 1, wherein the spacer block is of a single piece structure.

3. A low-profile stepping motor according to claim 1 or 2, wherein the spacer block is formed of resin.

4. A low-profile stepping motor according to any one of claims 1 to 3, wherein the spacer block has, on one side thereof, a plurality of hooks for securely retaining lead wires leading out from the first and second coil units.

5. A low-profile stepping motor according to claim 4, wherein the hooks are shaped as an L-letter in cross-section, have shorter bar sections thereof joined to the side of the spacer block and are disposed in a line such that the shorter bar sections are positioned alternately at opposite ends to one another.

* * * * *